United States Patent [19]

Roullet et al.

[11] Patent Number: 4,546,609

[45] Date of Patent: Oct. 15, 1985

[54] APPARATUS FOR PROVIDING A CONTINUOUS STREAM OF A CRYOGENIC LIQUID AND IN PARTICULAR LIQUID NITROGEN

[75] Inventors: Alain Roullet, Villejuif; André Lermuzeaux, Sucy-en-Brie, both of France

[73] Assignee: L'Air Liquide, Societe Anonyme pour l'Etude et l'Exploitation des Procedes Georges Claude, Paris, France

[21] Appl. No.: 613,252

[22] Filed: May 23, 1984

[30] Foreign Application Priority Data

May 30, 1983 [FR] France .................. 83 08887

[51] Int. Cl.[4] ........................... F17C 13/02
[52] U.S. Cl. ........................... 62/49; 62/55; 62/514 R
[58] Field of Search ............... 62/514 R, 49, 55

[56] References Cited

U.S. PATENT DOCUMENTS

| 3,025,680 | 3/1962 | DeBrosse et al. | 62/514 R |
| 3,333,587 | 8/1967 | Johnston | 62/514 R |
| 3,972,202 | 8/1976 | Stearns | 62/514 R |
| 4,228,662 | 10/1980 | Klipping | 62/514 R |

FOREIGN PATENT DOCUMENTS

| 0001392 | 4/1979 | European Pat. Off. |
| 0074702 | 3/1983 | European Pat. Off. |
| 2397591 | 2/1979 | France |
| 2496837 | 6/1982 | France |
| 426908 | 6/1967 | Switzerland |

OTHER PUBLICATIONS

Howard, F. S. "Geysering Inhibitor for Vertical Cryogenic Transfer Piping", *Advances in Cryogenic Engineering*, vol. 18, Proceedings of the Cryogenic Engineering Conference, Boulder, Plenum Press, 1973, pp. 162–169, Figs. 3,4.

*Primary Examiner*—Ronald C. Capossela
*Attorney, Agent, or Firm*—Young & Thompson

[57] ABSTRACT

In order to stop the continuous stream of liquid nitrogen supplied through the outlet conduit 4 of the device 2 for regulating the pressure, this conduit is provided with a stop electrovalve 5A combined with a degassing device 27 so that the flow of plain liquid in normal operation is not disturbed. Application to the pressurization of preserving boxes or cans by vaporization of liquid nitrogen.

15 Claims, 7 Drawing Figures

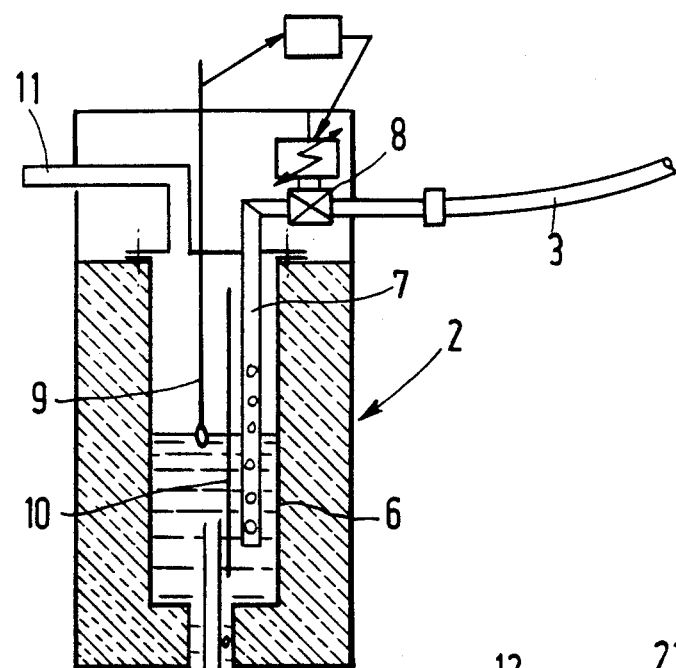
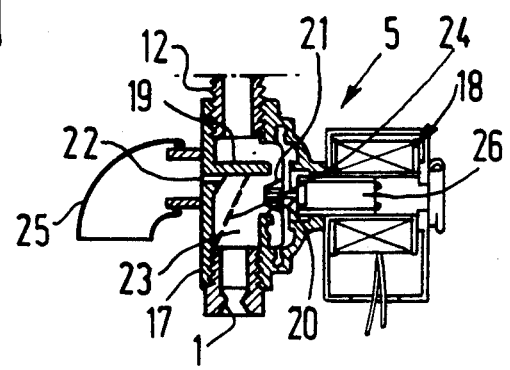
FIG.1
FIG.2 ive located downstream of the seat of the valve closure member, said outlet conduit communicating with free air through an orifice located downstream of the degassing device.

APPARATUS FOR PROVIDING A CONTINUOUS STREAM OF A CRYOGENIC LIQUID AND IN PARTICULAR LIQUID NITROGEN

The present invention relates to an apparatus for providing a continuous thin stream of a cryogenic liquid, in particular liquid nitrogen, of the type comprising a pressure regulating device provided with a liquid inlet conduit and a liquid outlet conduit. It is in particular applicable to the pressurization of preserving cans or tins by vaporization of liquid nitrogen.

Manufacturers of containers, in particular metal boxes or cans for large consumption liquids such as drinks, have been led, for reasons of cost, to use ever thinner material, in particular metal. Consequently, these containers have a decreased strength and there is a danger of crushing when they are stacked one on top of the other. While containers containing a product which itself gives off a gas, for example a carbonated drink, resist crushing relatively well, this is not true of containers containing a non-gaseous liquid, for example a non-gaseous drink such as mineral water, a fruit juice, etc. In this case the containers are subjected to an artificial pressurization, before the fixing of their cover by introduction of a few drops of liquified gas, usually nitrogen, which solves the problem of crushing.

When this method is applied to packing machines having a high rate of production, i.e. capable of filling 30,000 to 120,000 containers per hour arranged in a single row, there can be no question of interrupting the flow of liquid nitrogen between the successive containers and it is preferred to allow a continuous thin stream of liquid nitrogen to flow and to accept a slight loss of liquid between the successive containers which are fed at high speed under the pouring orifice for this liquid.

A problem arises when the feeding of the containers is temporarily interrupted for some reason. Indeed, it would be desirable to be in a position to interrupt the flow of nitrogen at the same time, but the presence of a single stop electrovalve in the liquid outlet conduit would result in an entry of heat producing bubbles in the outlet orifice, which is absolutely to be avoided in this application. The same problem arises if it is desired to adjust the liquid nitrogen flow to variable container feed rates.

An object of the invention is to provide simple and effective means for stopping as desired all or a part of the flow of liquid without disturbing this flow during the normal operation of the apparatus.

The invention therefore provides an apparatus of the aforementioned type, wherein the outlet conduit is provided with a stop valve disposed outside the pressure regulating device and combined with a degassing device located downstream of the seat of the valve closure member, said outlet conduit communicating with free air through an orifice located downstream of the degassing device.

In a first embodiment, the stop valve comprises a body provided, on the downstream side of the closure member seat, with a degassing chamber which communicates with the exterior through a vent placed at the upper end of this chamber.

In another embodiment, there is mounted downstream of the stop valve a purger which is adapted to communicate with the atmosphere when the liquid it contains drops below a predetermined level.

A few embodiments of the invention will now be described with reference to the accompanying drawings, in which:

FIG. 1 is a diagrammatic longitudinal sectional view of a first embodiment of the apparatus according to the invention:

FIG. 2 is a longitudinal sectional view, to an enlarged scale, of a detail of this apparatus;

Figure 3:
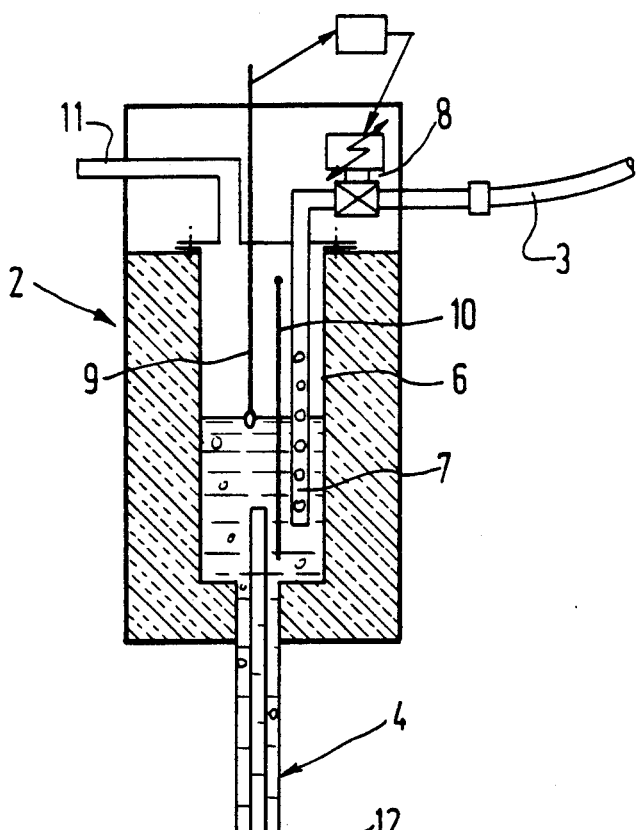
FIG. 3 is a diagrammatic longitudinal sectional view of a second embodiment of the apparatus according to the invention.
Figure 3:
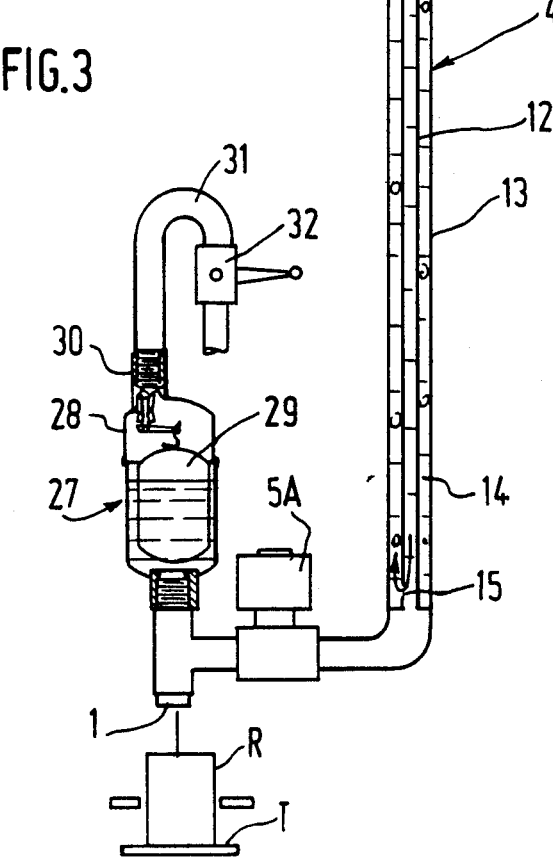

The apparatus shown in FIG. 1 is adapted to provide in normal operation a continuous stream of liquid nitrogen to a series of containers or cylindrical boxes or cans of thin aluminium which travel at high speed under the pouring orifice 1 for this liquid nitrogen, these containers being carried by a conveyor.

The orifice 1 has a small diameter, for example between 1 and 2 mm. The flow of liquid nitrogen is also small, for example of the order of 15 l/h for a feed rate of the order of 30,000 cans per hour.

In particular, these cans may contain a food product such as a non-gaseous drink. In passing under the orifice 1, each can receives a few drops of liquid nitrogen and is then hermetically closed by another apparatus (not shown). The nitrogen vaporizes in the closed cans and puts the latter under pressure, which ensures good subsequent strength. In another application it may be envisaged to pour a small amount of liquid nitrogen in the empty cans, upstream of their filling station, so as to evacuate air therefrom by vaporization of the nitrogen.

The apparatus shown in FIG. 1 comprises a device 2 for regulating the pressure of liquid nitrogen at the orifice 1. This device 2 is supplied with liquid nitrogen through an inlet conduit 3 and delivers this liquid nitrogen at a regulated pressure through an outlet conduit 4. The latter is provided at its downstream end with an electrovalve 5 combined with a degassing device.

The regulating device 2 comprises a container 6 into which is plunged a vertical perforated inlet tube 7 provided with an electrovalve 8 and to which the conduit 3 is connected. The electrovalve 8 is controlled by a sensor 9 which detects the liquid nitrogen level and may be of any known type. The container 6 also has a vertical antiswirl partition wall 10 and, in its upper part, a vent conduit 11 open to the atmosphere.

The outlet conduit 4, which extends vertically from the bottom of the container 6, is formed by a double tube, namely an inner tube 12 and an outer tube 13. The annular gap 14 therebetween is closed at its lower end and the inner tube 12 communicates at this end with the gap 14 through a ring arrangement of apertures 15. This tube 12 opens into the inlet orifice 16 of the electrovalve 5 which is seen better in FIG. 2.

The electrovalve 5 is formed by a body 17 and an actuating device 18. The body 17 constitutes an elongate conduit divided into an upper chamber and lower chamber by a horizontal baffle 19. Disposed below the latter is a large lateral opening 20 which may be closed by a valve member 21. Provided just below the baffle 19 in opposed relation to the opening 20 is a small vent 22 whose diameter may be of the order of 0.5 mm. An oblique strainer 24 is placed in front of this vent in the lower chamber 23 of the body 17. A downwardly open tubular elbow 25 is fixed to the outside of the body 17 around the vent 22. The chamber 23 terminates at its lower end in the orifice 1 for pouring the liquid nitrogen.

The actuating device 18 is formed by a solenoid whose moving part 26 carries the valve member 21.

The whole of the apparatus is suitably thermally insulated. Preferably, the electrovalve 5 has a detachable separate insulation so as to permit a convenient intervention in the event of breakdown. In order to render the drawing more clear, only the insulation of the device 2 has been shown.

In normal operation, the liquid nitrogen arrives in the container 6 through the conduit 3 and the tube 7 and is maintained at a constant level in the container by the sensor 9 and the electrovalve 8 which ensures at the orifice 1 a constant liquid nitrogen pressure equal to the liquid head above this orifice. The electrovalve 5 is open so that the liquid nitrogen passes round the baffle 19 and flows through the orifice 1 as a continuous stream.

The liquid nitrogen which surrounds the tube 12 provides a perfect thermal insulation of this tube. Entries of heat which reach the conduit 4 result in the formation of bubbles in the annular space 14. In rising to the container 6, these bubbles produce a circulation of liquid nitrogen from the tube 12 to the tube 13 through the apertures 15 in the direction of the indicated arrows. This ensures that only plain liquid reaches the electrovalve 5. Further, entries of heat in the region of the latter form bubbles in the chamber 23; these bubbles accumulate below the baffle 19 (the separation of the phases being encouraged by the strainer 24) and the gaseous nitrogen is discharged through the vent 22.

Consequently, it is plain liquid which issues through the lower orifice 1, which is an essential condition to ensure that the containers receive a substantially constant quantity of liquid nitrogen. The droplets of liquid which may pass through the vent 22 are recovered by the tube 25 and also drop into the containers, which limits the loss of liquid nitrogen.

When an incident in the packing line necessitates temporarily interrupting the feeding or travel of the containers, the electrovalve 5 is closed by applying the closure member 21 against its seat which is formed by the part of the opening 20 located below the baffle 19. The liquid nitrogen contained in the chamber 23 is emptied and then the flow stops. When the conveyor is again started up, the electrovalve 5 is again opened and the continuous flow of plain liquid is very rapidly resumed.

FIG. 3, in which a container R and the conveyor T have been shown, illustrates an apparatus which differs from the preceding apparatus only in respect of its device for stopping the flow of liquid nitrogen. Indeed, the conduit 4 feeds through its inner tube 12 a conventional electrovalve 5A adapted for the considered temperature level and communicating with a purger 27 which is seen better in FIG. 4.

The purger 27 comprises a container 28 which contains a float 29 and is provided at its upper end with a purge coupling 30. Coupled to the latter is a vent tube 31 which communicates with free air and is provided with a normally-open stop cock 32.

Pivotally mounted on the lower part of the coupling 30 is one end of a horizontal lever 33 which carries a closure member 34. The free end of this lever is engaged with a hook 35 fixed to the top of the float 29. The orifice 1 for pouring the liquid nitrogen is provided at the bottom of the container 28.

In normal operation (FIG. 3), the electrovalve 5A being open, the liquid nitrogen enters the container 28 under a regulated pressure and raises the float and this causes the coupling 30 to be closed by the closure member 34. The bubbles formed in this container accumulate in the upper part of the latter and this ensures that plain liquid flows through the orifice 1. These bubbles cause the pressure in the container 28 to rise and urge the liquid nitrogen, and consequently the float 29 and the lever 33 connected thereto, downwardly. As soon as a certain overpressure is developed, the descent of the float therefore opens the coupling 30 and ensures the purging of excess gas. When the electrovalve 5A is closed the container 38 empties and when starting up again, the nitrogen is immediately degassed in the purger 27 and immediately flows in the form of plain liquid.

As illustrated, it is advantageous to surround the orifice 1 with a bell 36 so as to limit access of humidity and heat to this orifice.

Figure 4:
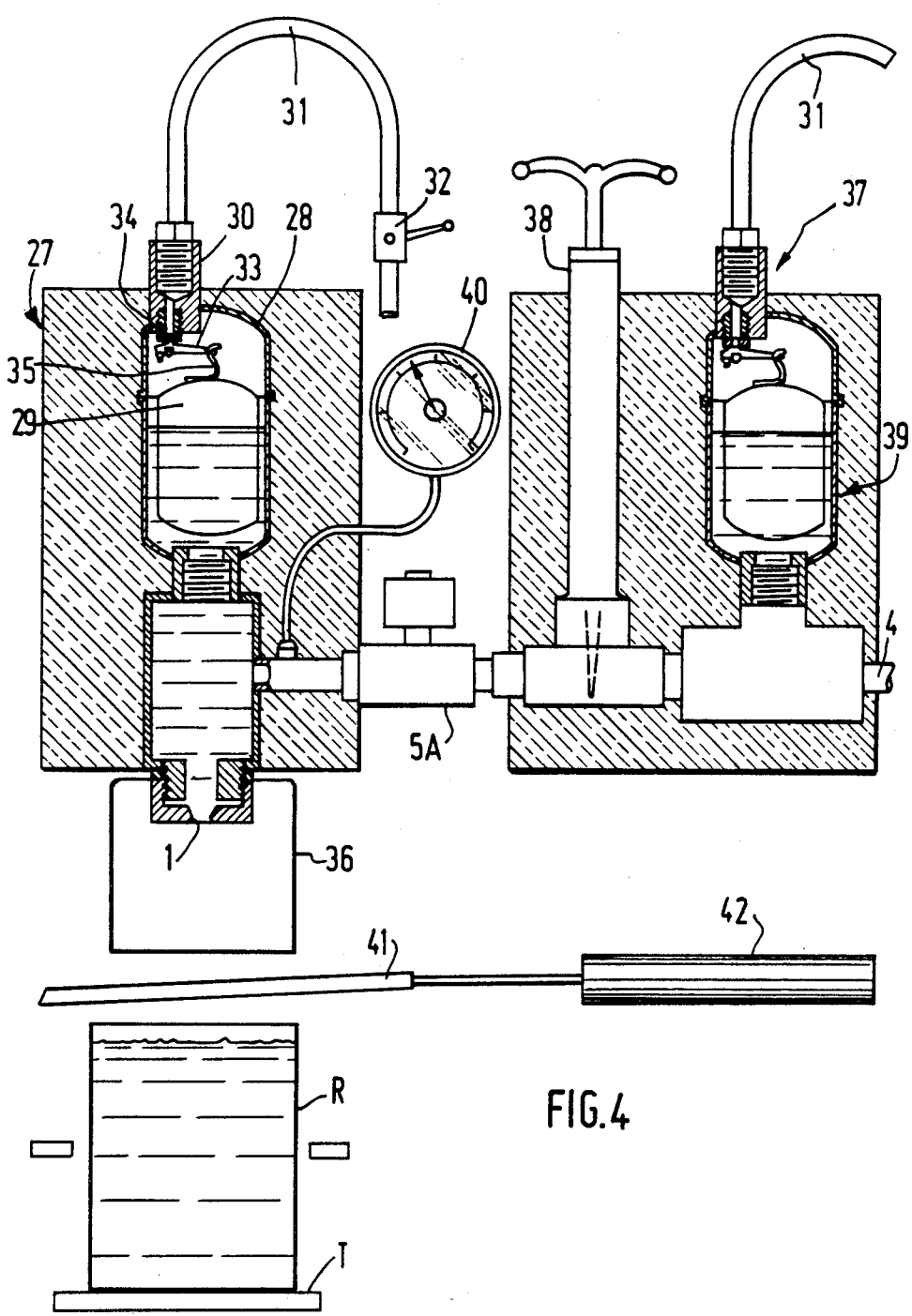
FIG. 4 is a partial longitudinal sectional view, to an enlarged scale, of a modification of the apparatus of FIG. 3, adapted to regulate the flow of liquid.

The apparatus shown in FIG. 4 is similar to that shown in FIG. 3, but the conduit 4 is provided, just upstream of the electrovalve 5A, with a pressure regulating device 37 which is particularly suitable when the liquid nitrogen is supplied through the conduit 4 under a relatively high pressure, for example of the order of 0.3 to 1.5 bars gauge pressure. This device 37 comprises a needle valve 38 which may be motorized and automated, preceded by a second purger identical to the purger 27. This second purger is necessary since the wire drawing of the liquid produced by the valve 38 is only effective if it concerns plain liquid. The pressure is read off a pressure gauge 40 connected to the purger 27. As shown, the device 37 and the purger 27 are heat insulated and the electrovalve 5A is exposed to the ambient air.

The apparatus shown in FIG. 4 further comprises a device for instantaneously interrupting the flow of liquid nitrogen into the containers R when the conveyor T stops. This device is formed by a retractable plate 41 actuated by apneumatic cylinder device 42. By way of a modification (FIG. 5), it may comprise a compressed air nozzle 43 which is pointed in the direction of the stream of liquid nitrogen. Such a device permits avoiding the pouring of an excessive amount of liquid nitrogen into the container stopped below the orifice 1 and thereby avoiding the risk of a bursting of this container after it has been closed.

Figure 5:
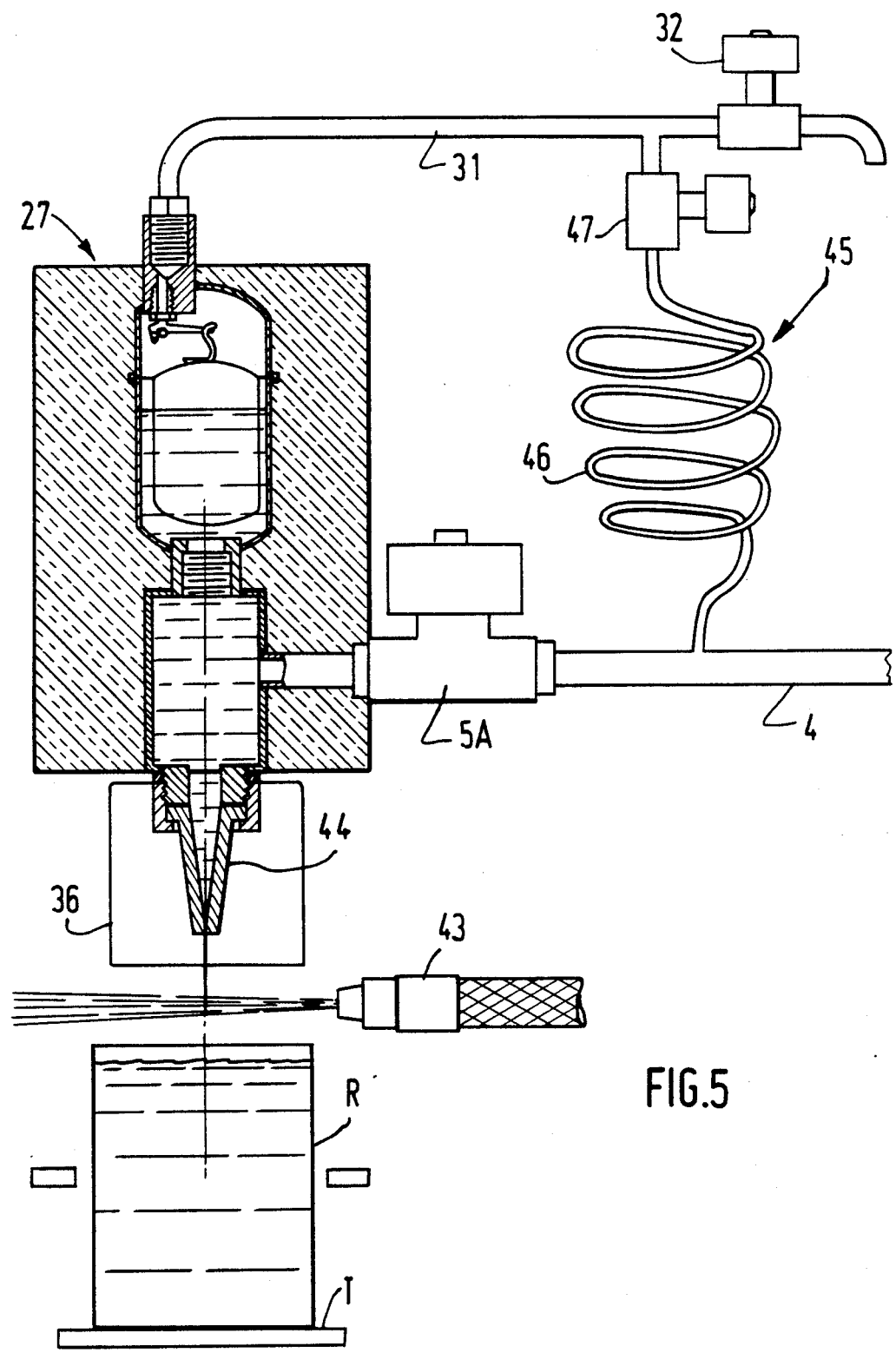
FIG. 5 is a similar view of another modification.

In the modification shown in FIG. 5, the orifice 1 is provided by a conical porous plug 44. In this way the liquid nitrogen issues therefrom at a substantially zero gauge pressure, even if the supply is ensured by a regulating device adapted to supply this liquid under relatively high pressure. This avoids the effect of impact of the liquid nitrogen in the containers and consequently avoids splashing out of the containers of the product they contain or of the liquid nitrogen itself.

FIG. 5 also shows a by-pass 45 which connects the conduit 4, upstream of the electrovalve 5A, to the vent tube 31, upstream of the cock 32 which is here an electrovalve. The by-pass 45 includes a vaporizing coiled tube 46 and an electrovalve 47.

When the electrovalve 5A is closed, the electrovalve 32 is also closed and the electrovalve 47 is opened. Consequently, nitrogen is vaporized in the coiled tube 46, reaches the purger 27, rapidly expels the liquid nitrogen therein, then escapes through the orifice 1 while maintaining in the purger a dry and cold nitrogen atmosphere. This reduces the risk of accumulation of ice around the orifice 1.

Figure 6:
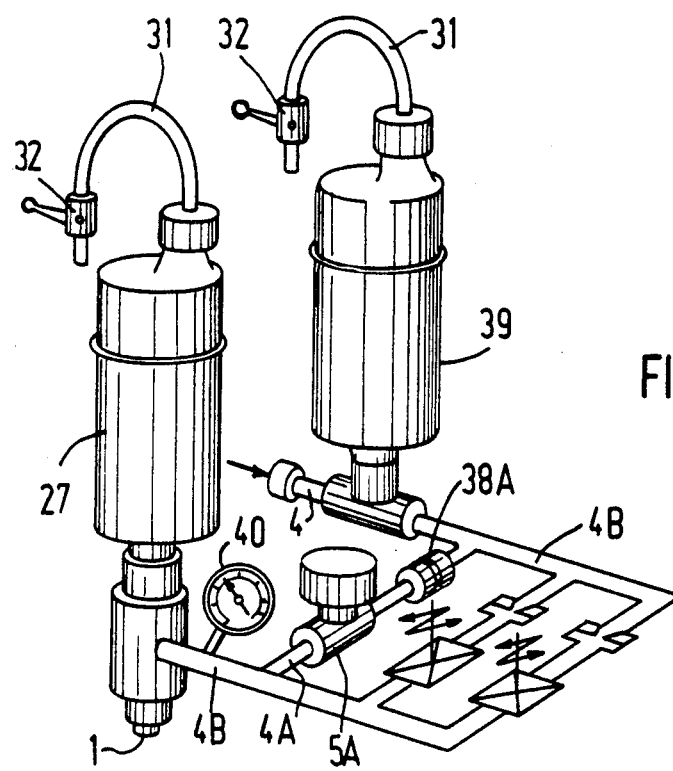
FIGS. 6 and 7 are partial perspective views of two other apparatus according to the invention capable of regulating the flow of liquid.
Figure 7:
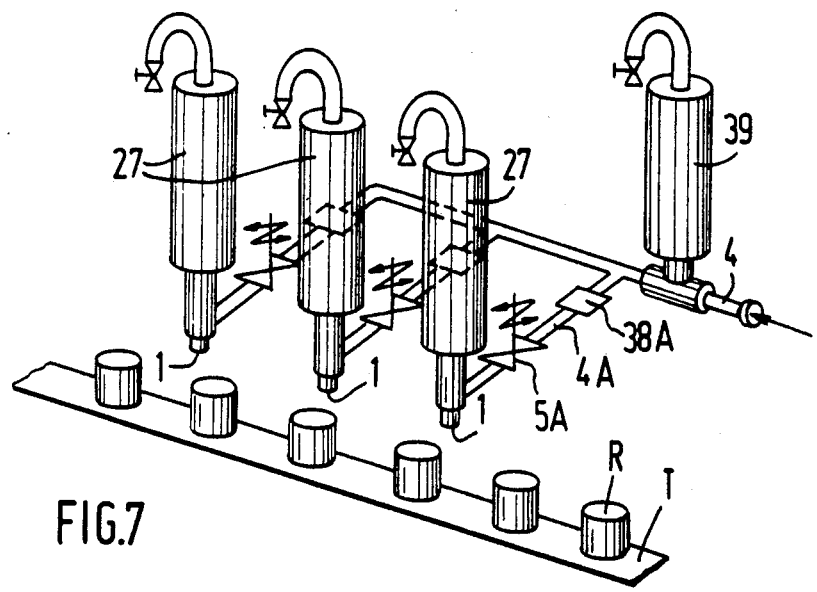

FIGS. 6 and 7 illustrate two circuits for regulating the amount of liquid nitrogen supplied to each container R. In FIG. 6, mounted between the common upstream purger 39 and the common downstream purger 27 are three pipes 4A in parallel communicating with two manifolds 4B and each equipped with throttling means 38A and an electrovalve 5A. In FIG. 7, these three pipes 4A are mounted between the common upstream purger 39 and three respective downstream purgers 27 each provided with an orifice 1 for pouring liquid nitrogen.

In particular, in FIGS. 6 and 7, the three throttling means 38A may have different passage sections, for example in the ratios 1, 2 and 3, so that it is possible by opening 1,2 or 3 electrovalves 5A to obtain six different rates of flow in ratios ranging from 1 to 6.

The apparatus shown in FIGS. 6 and 7 and that shown in FIG. 4 enable the rate of flow of liquid nitrogen to be adapted to the variations in the speed of the conveyor T, particularly in its stages in which it increases speed. The valve 38 (FIG. 4) may be regulated or one or more electrovalves 5A (FIGS. 6 and 7) may be selectively opened automatically by detecting on the downstream side the internal pressure of the containers R after their closure, for example by measuring the bulge of their cover or lid. The possibility of modifying the rate of flow of liquid nitrogen also enables the apparatus to be adapted to various utilizations of the same installation (containers R empty or containing liquids at different temperatures).

A similar circuit to that shown in FIG. 7 may be adapted to the apparatus shown in FIG. 1. For this purpose, the tube 13 is made to open into a horizontal manifold which is closed at both ends and divided at mid-height by a horizontal perforated sheet. The inner tube 12 is extended to below this sheet, and a plurality of pipes, for example three pipes, extend from the lower of said manifold and respectively feed the electrovalves, such as the electrovalve 5 of FIG. 2. In this way, a degassing is ensured, on one hand, in the double tube 12-13, and, on the other hand, in the horizontal manifold, and in the body 17 of each electrovalve 5.

What is claimed is:

1. An apparatus for delivering a continuous thin stream of a cryogenic liquid, in particular liquid nitrogen, said apparatus comprising a pressure regulating device having a liquid inlet conduit, liquid outlet conduit means and a stop valve having a body and provided in the outlet conduit means outside the pressure regulating device, said outlet conduit means comprising an upstream conduit portion extending from said pressure regulating device and including a first chamber of said stop valve body, and a downstream conduit portion comprising a second chamber of said body separated from said first chamber by a seat for a closure member of said valve and extending to a calibrated liquid discharge orifice communicating with free air, the apparatus further comprising a degassing device having an inlet port communicating with said downstream conduit portion.

2. An apparatus according to claim 1, wherein said degassing device is a vent the inlet end of which is located adjacent an upper end of said second chamber and which has an outlet end in communication with free air.

3. An apparatus according to claim 2, comprising a strainer disposed in said second chamber in front of said inlet end.

4. An apparatus according to claim 3, in which said vent has the shape of a downwardly open tubular elbow.

5. An apparatus according to claim 2, in which said vent has the shape of a downwardly open tubular elbow.

6. An apparatus according to claim 1, wherein the degassing device is a purger whose inlet end is connected downstream of the stop valve and which has an outlet vent conduit adapted to communicate with free air when the liquid contained therein drops below a predetermined level.

7. An apparatus according to claim 6, further comprising a bypass constituting a vaporizer and connecting said upstream conduit portion, upstream of the stop valve to the vent conduit of the purger, said bypass and the vent conduit, downstream of said bypass, being each provided with a stop-cock.

8. An apparatus according to claim 1, wherein said upstream conduit portion includes, in at least a part of its length from the pressure regulating device, an interior tube surrounded by an exterior tube with which exterior tube it communicates at its downstream end.

9. An apparatus according to claim 1, wherein each of said upstream and downstream conduit portions comprises a manifold, a plurality of said stop valves being connected in parallel between the manifolds, a common said degassing device communicating with the manifold of said downstream conduit portion.

10. An apparatus according to claim 1, wherein said upstream conduit portion comprises a manifold to which a plurality of stop valves are connected, each valve having a respective downstream conduit portion and a respective degassing device.

11. An apparatus according to claim 1, wherein said calibrated orifice is provided by a porous plug.

12. An apparatus according to claim 1, comprising disposed below said orifice a device for instantaneously stopping the liquid.

13. An apparatus according to claim 12, wherein said stopping device is a retractable plate.

14. An apparatus according to claim 12, where said stopping device is a compressed gas nozzle.

15. An apparatus according to claim 1, wherein said stop valve is exposed to ambient air.

* * * * *